United States Patent
Stevens

[11] Patent Number: 6,102,433
[45] Date of Patent: Aug. 15, 2000

[54] COMPACT CART

[76] Inventor: Terence Stevens, 3216 Fielding Pl., Greens, N.C. 27405

[21] Appl. No.: 09/418,739

[22] Filed: Oct. 15, 1999

[51] Int. Cl.[7] ........................................... B62B 1/00
[52] U.S. Cl. ...................... 280/646; 280/655; 280/47.29
[58] Field of Search ................................. 280/646, 654, 280/655, 47.29, 47.27, 79.3, 655.1, 639, 652

[56] References Cited

U.S. PATENT DOCUMENTS

| | | |
|---|---|---|
| D. 301,653 | 6/1989 | Cacioppo . |
| 2,757,935 | 8/1956 | Sofia .......................................... 280/654 |
| 2,891,802 | 6/1959 | Moran ........................................ 280/654 |
| 3,043,603 | 7/1962 | Major . |
| 3,194,576 | 7/1965 | Kunkle ...................................... 280/654 |
| 3,197,226 | 7/1965 | Erlinder . |
| 3,241,852 | 3/1966 | Muller et al. . |
| 3,947,054 | 3/1976 | Hall . |
| 4,037,858 | 7/1977 | Adams . |
| 4,062,565 | 12/1977 | Holtz . |
| 4,281,849 | 8/1981 | Chandick et al. ....................... 280/655 |
| 4,299,403 | 11/1981 | Brewer et al. . |
| 4,315,632 | 2/1982 | Taylor . |
| 4,448,434 | 5/1984 | Andersen . |
| 4,506,897 | 3/1985 | Libit . |
| 4,637,626 | 1/1987 | Foss et al. . |
| 4,639,004 | 1/1987 | Maeda et al. . |
| 4,659,096 | 4/1987 | Leimgruber . |
| 4,726,602 | 2/1988 | Sanders et al. ......................... 280/654 |
| 4,746,141 | 5/1988 | Willis . |
| 4,759,559 | 7/1988 | Moulton . |
| 4,858,940 | 8/1989 | Cheng .................................. 280/655 X |
| 4,865,346 | 9/1989 | Carlile . |
| 4,969,660 | 11/1990 | Spak . |
| 4,989,889 | 2/1991 | Perez . |
| 5,072,958 | 12/1991 | Young . |
| 5,127,662 | 7/1992 | Spak . |
| 5,348,325 | 9/1994 | Abrams . |
| 5,626,352 | 5/1997 | Grace ..................................... 280/655.1 |
| 5,685,552 | 11/1997 | Osaki ...................................... 280/646 |
| 5,863,055 | 1/1999 | Kasravi . |

FOREIGN PATENT DOCUMENTS

| | | | |
|---|---|---|---|
| 544684 | 2/1954 | Canada ................................. 280/654 |

*Primary Examiner*—Brian L. Johnson
*Assistant Examiner*—Bryan Fischmann

[57] ABSTRACT

Foldable handcart comprised of a rectangular shaped frame with four sections hinged to its top, bottom and both sides. When the cart is folded, the four hinged sections collapse into the rectangular frame to form a single compact unit. Hinged on top of the rectangular frame, the top section is erect when the cart is fully extended. The top section has attached to its upper end the main handle that is used to manipulate the cart. The next section is hinged at the base of the rectangular frame and forms a right angle with the front of the rectangular frame when fully extended. The rectangular frame has two sections hinged on either side. Both side sections have attached to its lower outside corner a wheel that allows the cart to roll. The side sections open outwards on each side of the rectangular shaped frame extending the carts width and for widely spaced wheels. When the cart is folded the top and bottom sections folds forward into the rectangular frame and both side sections fold backward.

4 Claims, 7 Drawing Sheets

COMPACT CART

References Cited

UNITED STATES PATENT DOCUMENTS

| 3,043,603 | June, | 1959 | Major, Sr. | 280/40 |
|---|---|---|---|---|
| 3,197,226 | Dec., | 1963 | Erlinder | 280/36 |
| 3,241,852 | Jul., | 1964 | Muller et al. | 280/40 |
| 3,947,054 | Mar., | 1976 | Hall | 280/36 |
| 4,037,858 | Jul., | 1977 | Adams | 280/626 |
| 4,062,565 | Dec., | 1977 | Holtz | 280/655 |
| 4,299,403 | Nov., | 1981 | Brewer | 280/47 |
| 4,315,632 | Feb., | 1982 | Taylor | 280/47.29 |
| 4,448.434 | May, | 1984 | Anderson | 280/40 |
| 4,506,897 | Mar, | 1985 | Libit | 280/40 |
| 4,637,626 | Jan., | 1987 | Foss et al | 280/655 |
| 4,659,096 | Apr., | 1987 | Leimgruber | 280/39 |
| 4,746,141 | May, | 1988 | Willis | 280/655 |
| 4,969,660 | Nov., | 1990 | Spak | 280/646 |
| 4,989,889 | Feb., | 1991 | Perez | 280/39 |
| 5,072,958 | Dec., | 1991 | Young | 280/40 |
| 5,127,662 | Jul., | 1992 | Spak | 280/40 |
| 5,348,325 | Sept., | 1994 | Abrams | 280/40 |
| 5,626,352 | May, | 1997 | Grace | 280/47.29 |
| 5,863,055 | Jan., | 1999 | Kasravi, et al | 280/47.29 |

BACKGROUND OF THE INVENTION

This invention relates to a cart that folds into a compact unit that is easily transported or stored. This cart allows easy transport of packages or luggage to and from vehicles, through airports, train or bus stations. When not in use this cart is easily stored in areas of limited space.

Carts are designed to carry luggage, doors, furniture and numerous other items. While some carts are adapted to be collapsible and portable, none discloses all the advantages of general purpose and condensability.

U.S. Pat. No. 4,989,889 to Perez discloses a foldable cart for shopping. U.S. Pat. No. 4,865.346 to Carlile discloses a collapsible cart for carrying beach items. U.S. Pat. No. 4,746,141 to Willis discloses a foldable door carrier. U.S. Pat. No. 4,639,004 to Maeda, U.S. Pat. No. D 301,653 to Cacioppo, U.S. Pat. No. 3,180,507 to Ott et al, U.S. Pat. No. 4,759,559 to Moulton, and U.S. Pat. No. D 208,770 to Curtis, all disclose a perpendicular extending lower toe for supporting the items for which it was made to carry. However, each of the carts disclosed in these patents lacks at least one important feature of the presented invention. Characteristics such as lightweight, a wider wheel base to prevent the cart from overturning, the versatility to be condensed for easy transport, the convenience to endure unexpected loads, the flexibility to carry more than one fixed article, and folding into a durable compact unit are examples of the deficiencies.

The cart is made to be lightweight and easy to fold. When folded, it can fit in a standard size computer bag, under car seats, in luggage, and in overhead compartments in an aircraft. When extended the handle is made to be high and is adjustable for the user's comfort. Both wheels are widely spaced to endure uneven surfaces without embarrassing overturns.

SUMMARY OF THE INVENTION

This invention relates to a foldable handcart comprised of a rectangular shaped frame with four rectangular shaped sections attached to its top, base and both sides. When the cart is folded, the four attached sections collapse into the rectangular frame to form a single compact unit. Hinged on top of the rectangular frame, the upper rectangular shaped section is erect when the cart is fully extended and has attached to its upper end the main handle that is used to manipulate the cart. When the cart is not in use, the handle is pushed down into the top rectangular section and this section fold forward into the rectangular frame. The second of the four rectangular sections is hinged at the base of the rectangular frame and forms a right angle with the front of the rectangular frame when fully extended. The bottom rectangular section is where items are placed for transport. When not in use the bottom rectangular section folds into the front of the rectangular frame and lie alongside the top rectangular section. The third and fourth sections are hinged on each side of the rectangular shaped frame and have attached to their lower outside corners, a wheel that allows the cart to roll. The two side rectangular sections open outward on each side of the rectangular shaped frame extending the carts width and for widely spaced wheels. When not in use, both side sections fold backward into the rectangular shaped frame meeting medially.

Similar to conventional luggage and delivery carts, this invention will provide users with means to transport goods with little effort or stress. Furthermore, the present invention, being compact and convenient, saves the user time, effort, and money needed to find assistance when carrying luggage or packages.

DETAILED DESCRIPTION OF THIS INVENTION

Figure 1:
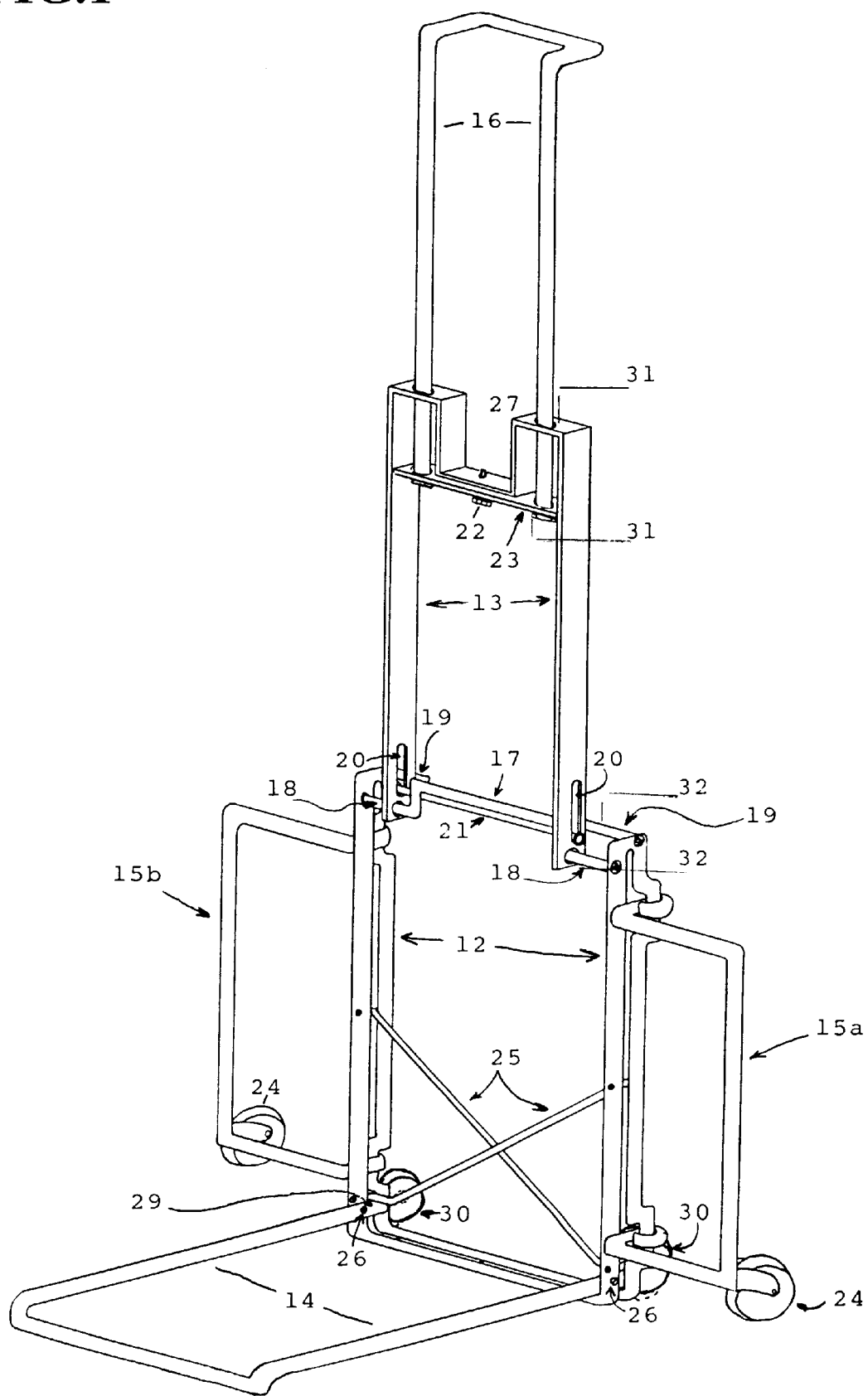
FIG. 1 is a perspective view of the compact carrier of this invention in a fully opened position.
Figure 2:
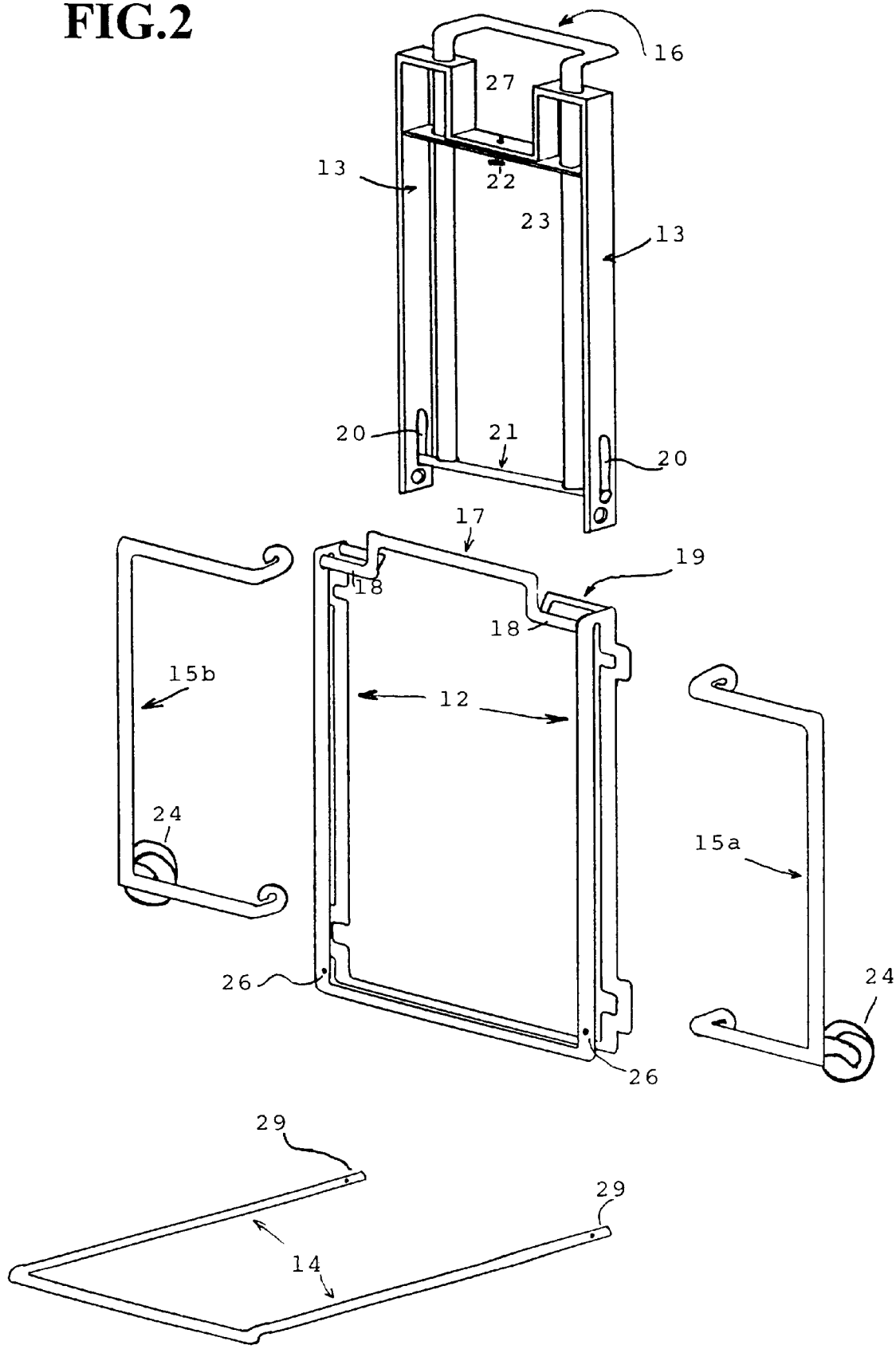
FIG. 2 is a perspective and exploded view of the compact carrier of this invention showing all hinged sections detached.

The general features of this invention are best seen in FIGS. 1–4. As shown in FIG. 2, rectangular shaped frame 12 has four sections attached to its top, bottom and both sides. The four sections collapse and fold alongside each other in frame 12 to form the single compact unit in FIG. 4.

Figure 5:
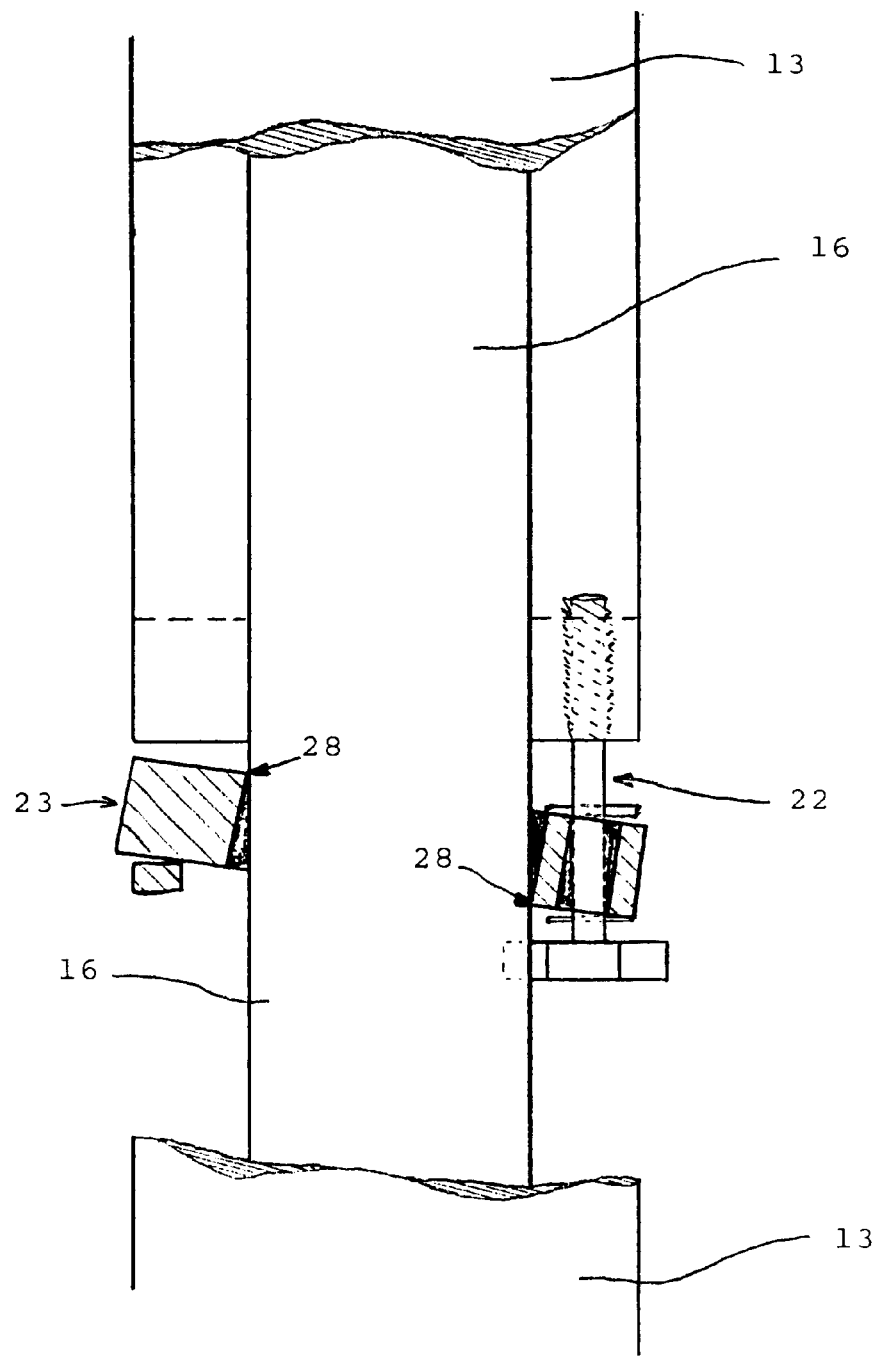
FIG. 5 is a cross sectional view taken at 31—31 of FIG. 1.
Figure 6:
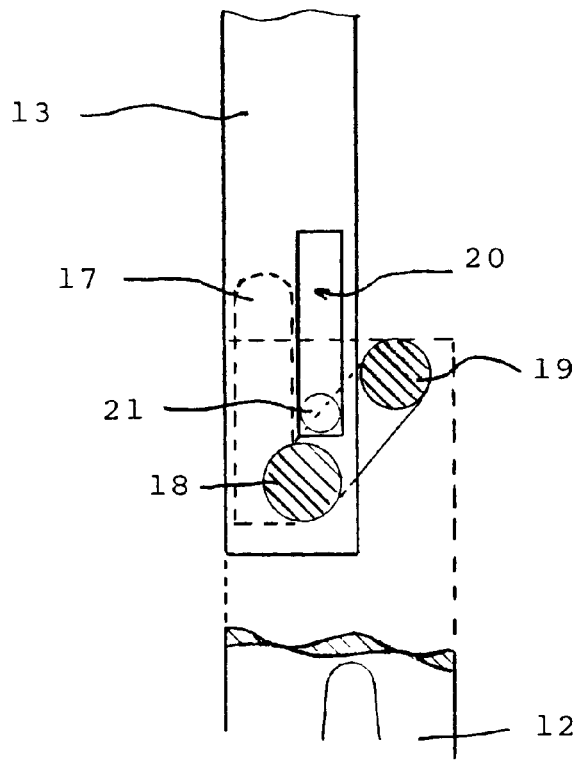
FIG. 6 is a cross sectional view taken at 32—32 of FIG. 1, showing the top rectangular section in a locked upright position.
Figure 7:
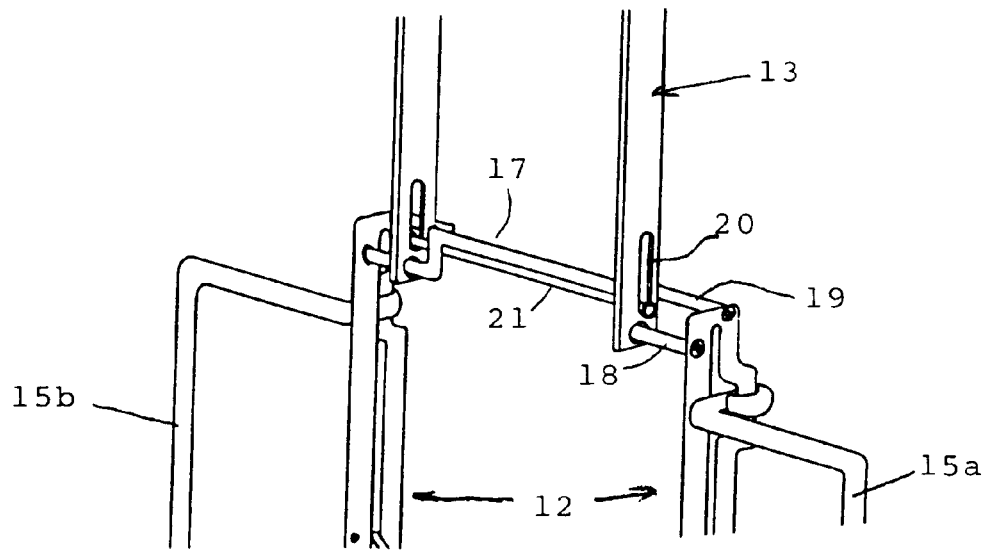
FIG. 7 is a perspective view of FIG. 6.
Figure 8:
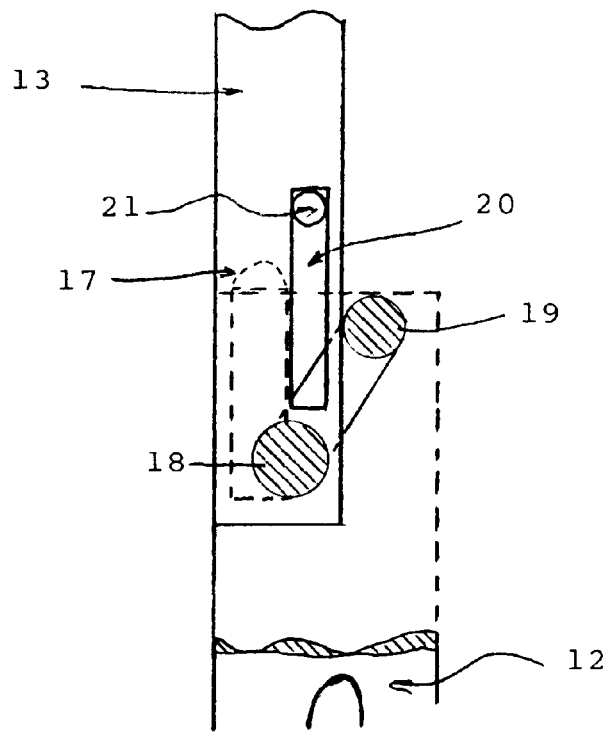
FIG. 8 is a cross sectional view taken at 32—32 of FIG. 1, showing the top rectangular section in an unlocked upright position.
Figure 9:
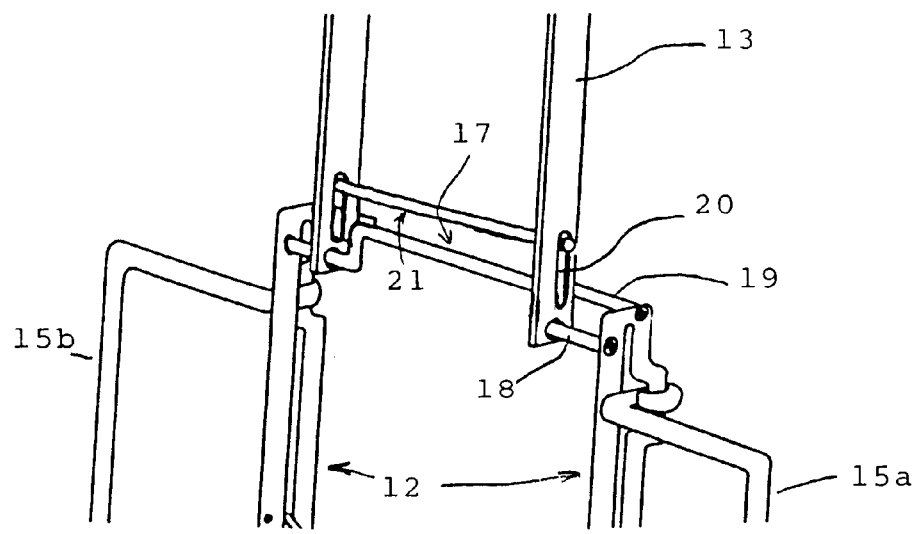
FIG. 9 is a perspective view of FIG. 8.
Figure 10:
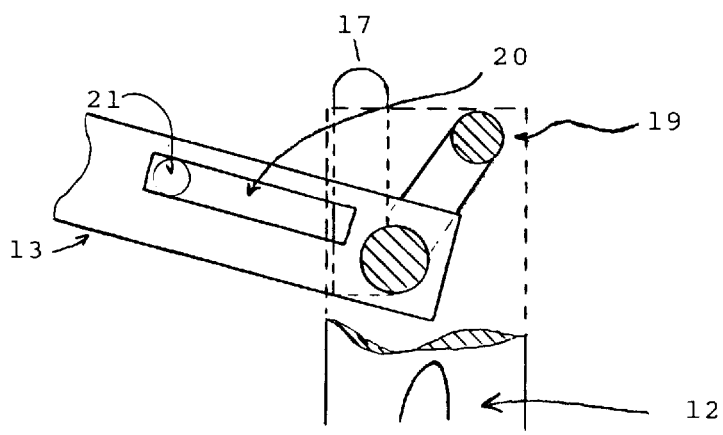
FIG. 10 is a cross sectional view taken at 32—32 of FIG. 1, showing the top rectangular section in a partially collapsed position.
Figure 11:
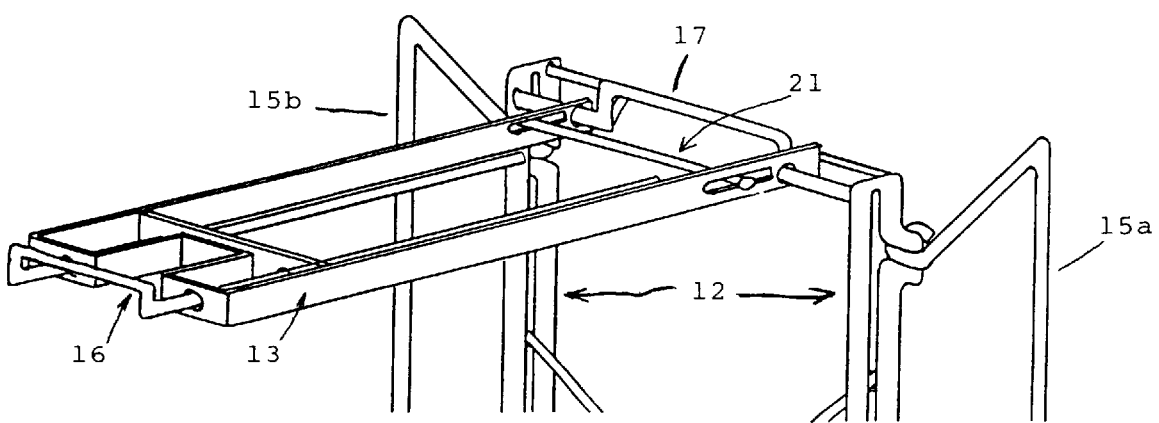
FIG. 11 is a perspective view of FIG. 10.

The first of the four sections is 13. Section 13 pivots on shaft 18 at the top of frame 12. When the cart is unfolded, section 13 is erect and has at its upper end handle 16 that is used to manipulate the cart. Handle 16 extends through holes located in the top of section 13 and guide 23. As shown in FIG. 5, handle 16 is held stable by a tilt of guide 23 created when screw 22 is advanced. When tilted guide 23 creates friction with handle 16 at points 28 to stop any up or down movement. Handle 16 is free to move up or down by reversing screw 22 causing guide 23 to balance therefore releasing all contact between guide 23 and handle 16. FIGS. 6 and 7, show section 13 held upright by bar 19. Section 13 is locked in an upright position when bar 21 is brought down slot 20 and is placed behind shaft 17. FIGS. 8 and 9, illustrates section 13 unlocked by bringing bar 21 up slot 20 allowing it to pass over shaft 17. As shown in FIGS. 10 and 11, section 13 can fold forward when bar 21 is lifted and passes over shaft 17. When the cart is collapsed, section 13 folds forward inside frame 12 and shaft 17 is used as a handle to carry the folded cart.

Figure 3:
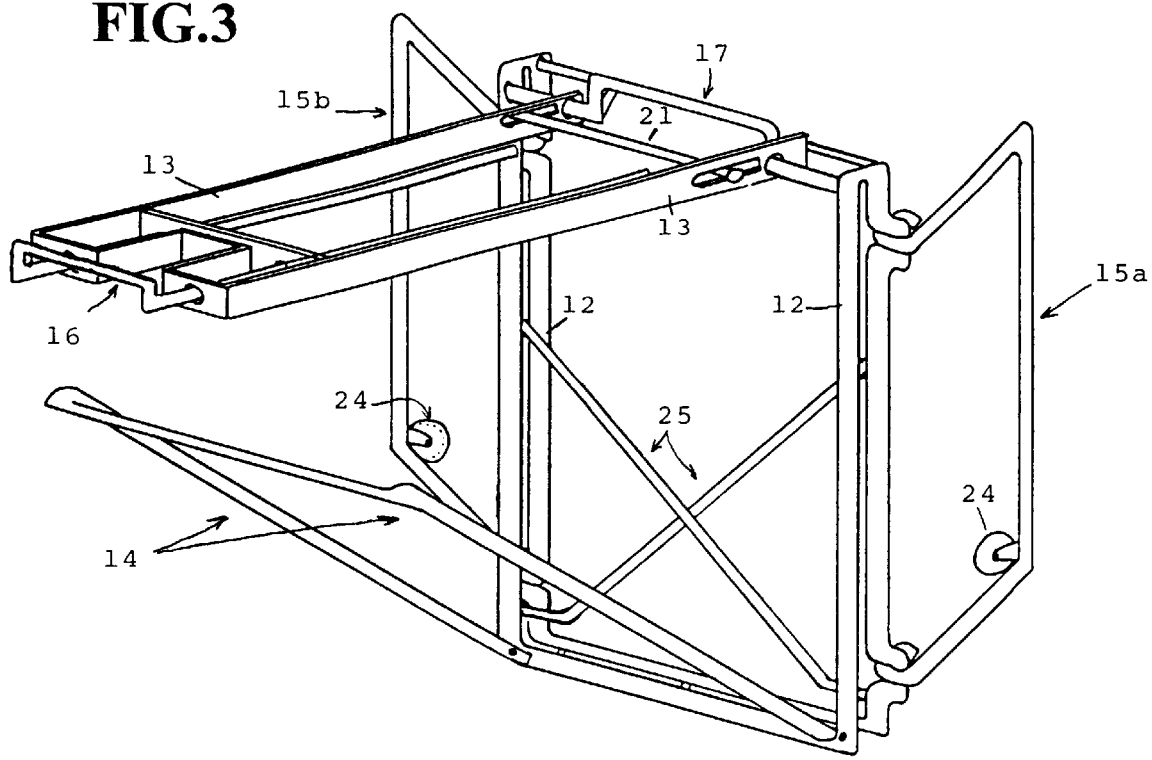
FIG. 3 is a perspective view of the compact carrier of this invention in a partially closed position.
Figure 4:
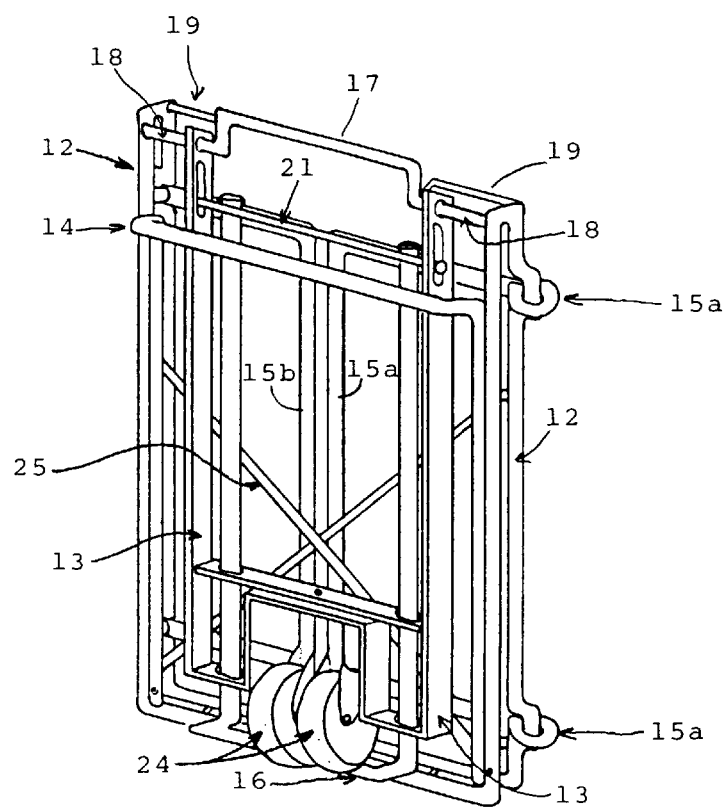
FIG. 4 is a perspective view of the compact carrier of this invention in a fully folded position.

The second of the four sections attached to frame 12 is section 14. As shown in FIG. 1, section 14 is attached to the base of frame 12 and pivots at points 26. When the cart is unfolded, section 14 folds down and forms a right angle with the front of frame 12. Section 14 remains perpendicular with frame 12 when its trailing edges 29 contact and rest against support bars 25. Rectangular shaped section 14 is where items are placed for transport. As shown in FIG. 3, when not in use, section 14 folds into the front of frame 12 after section 13 has been folded. Section 14 is wider than section 13 allowing the sections to fold next to each other vertically. The tip of section 14 is curved outwards to overlay section 13 horizontally allowing the two supports to lie alongside each other inside frame 12.

The third and fourth sections are 15a and 15b. The two sections are hinged on each side of frame 12 and have attached to their lower outside corner wheels 24 that allows the cart to roll. As shown in FIG. 1, when the cart is in use sections 15a and 15b open outward on each side of frame 12 extending the width and for wide wheel separation. As shown in FIG. 3, when the cart is not in use sections 15a and 15b fold backwards into frame 12 and wheels 24 meet midway passing through square shaped opening 27, formed by the top of section 13 and handle 16.

This cart is made to be lightweight and easy to fold. When fully extended handle 16 is made to be high and is adjusted for the user's comfort. Wheels 24 are widely spaced to endure uneven surfaces without embarrassing overturns. When folded, the cart can fit in a standard sized computer bag, under car seats, over head compartment in an aircraft, and in luggage.

Preferably all parts of the carrier are made of aluminum for strength and lightness of weight. Other materials such as steel, plastic, etc. are of course operable. As shown in FIGS. 1 and 2, for more industrial and heavy duty work, frame 12 is assembled with wheels 30 in its lower outside corners in addition to wheels 24 on section 15a and 15b. The additional wheels are for massive weight that may cause frame 12 to bend if endured for long periods.

What is claimed is:

1. A foldable cart comprised of a rectangular shaped frame (12) with four sections hinged on its top, bottom and both sides, said top section (13) pivots on a horizontal shaft on top of said rectangular frame and extends erect when the cart is unfolded, said top section has attached to its upper end a handle that's used to manipulate the cart, said handle is pushed down into said top section when the cart is folded and said top section folds forward into said rectangular frame, said rectangular frame has said bottom section (14) hinged on its bottom that extends perpendicular with the front of said rectangular frame when the cart is unfolded, when folded said bottom section folds up into said rectangular frame alongside said top section, said rectangular frame has said side sections (15a, 15b) hinged on both sides two sections that have attached to their lower outside corner a wheel (24) that allows the cart to roll, when the cart is unfolded both said side sections open outwards on either side of said rectangular frame extending the width and allowing widely spaced wheels for transportation, when folded both said side sections fold backward into said rectangular frame.

2. The cart of claim 1 which additionally comprises a pair of wheels (30) attached to the base corners of said rectangular shaped frame.

3. The cart of claim 1 wherein said horizontal shaft (17) is curved upwards in its center and is used as a handle when said top section is folded.

4. The cart of claim 1 wherein said top section has a bar (21) that extends horizontally at its bottom and said rod is movable in a slot (20) located on both sides of said top section, said rod is placed behind said horizontal shaft (17) to lock said top section erect.

* * * * *